Feb. 18, 1930.  E. G. BAUM  1,747,343
BOTTLE CAPPING MECHANISM
Filed July 1, 1925   5 Sheets-Sheet 1

Patented Feb. 18, 1930

1,747,343

UNITED STATES PATENT OFFICE

EWALD GEORGE BAUM, OF NATICK, MASSACHUSETTS, ASSIGNOR, BY MESNE ASSIGNMENTS, TO AMERICAN SEAL-KAP CORPORATION, OF LONG ISLAND CITY, NEW YORK, A CORPORATION OF DELAWARE

BOTTLE-CAPPING MECHANISM

Application filed July 1, 1925. Serial No. 40,807.

This invention relates to mechanism for capping bottles having been particularly designed to apply caps of a special form to milk bottles and as a unit mechanism applicable as the capping portion of a milk bottle filling and capping machine. While in certain respects not limited thereto, it has been designed more particularly for application to machines of the well known Milwaukee type.

The bottle cap is preferably formed in two sections assembled together and applied to the bottle as a unit, one of these sections comprising a substantially cup-shaped member, the base of which is adapted to be seated on the usual disk-receiving ledge of the milk bottle, the upstanding marginal wall of this member engaging the inner wall of the bottle neck above this ledge and its edge portion being turned over the pouring lip at the top of the bottle and engaging its exterior to form a housing for this lip. The other section comprises a disk seated on the marginal portion of the base of the cup-shaped member and in close engagement with its upstanding wall portion.

The cap applying member is designed to place the cap in position with the base of the cup-shaped portion resting on and having seating engagement with the inner edge of the usual disk supporting ledge and to expand the upstanding margin against the inner wall of the bottle. Mechanism for feeding the caps to this member is also provided, the presence of a bottle in position to be capped being necessary to cause a cap to be presented.

For a more complete understanding of this invention, reference may be had to the accompanying drawings in which.

Figures 10, 11, 12, 13:
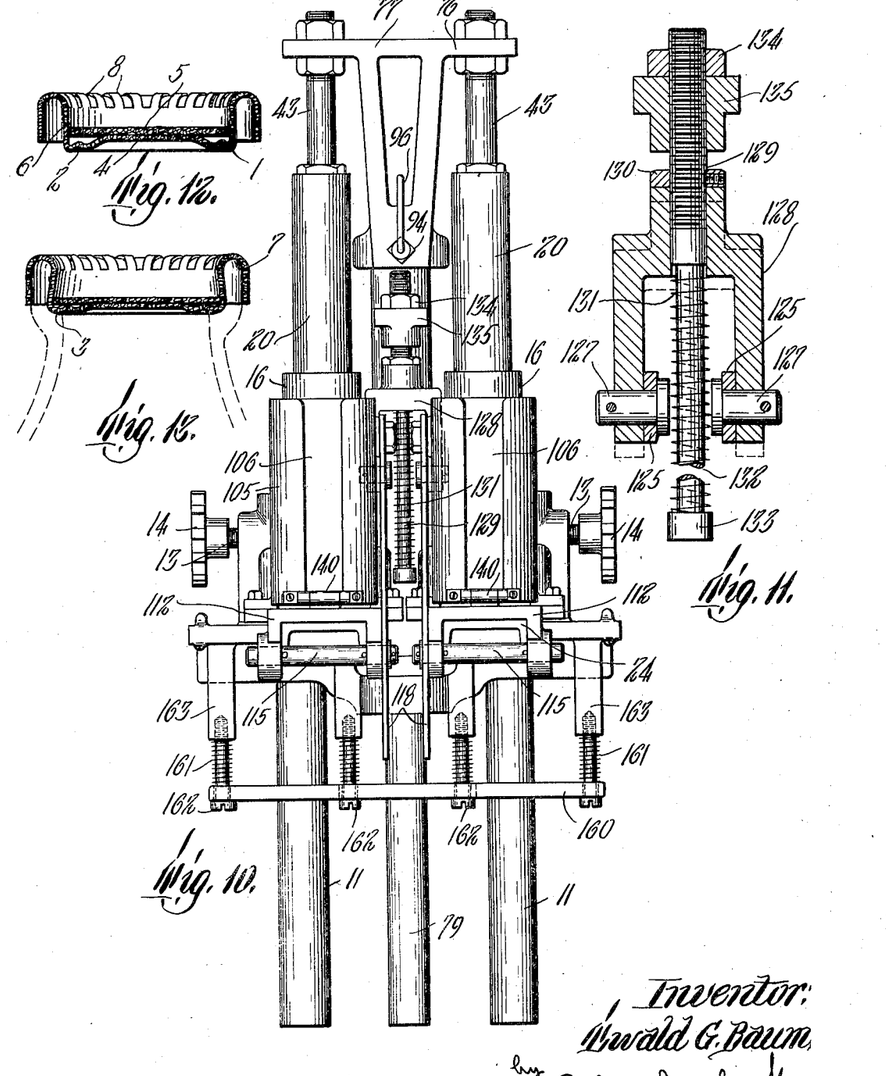
Figure 10 is a front elevation of the mechanism.
Figure 11 is an enlarged detail partly in section of parts shown in Figure 10.
Figures 12 and 13 are detail sections illustrating the cap before and after being applied to a bottle.

Referring first to Figures 12 and 13 it will be seen that the cap to be applied comprises a substantially cup-shaped member 1 having a marginal base portion 2 formed with an annular depression for engagement with the usual disk-receiving ledge 3 of the bottle and within this margin having a central raised portion 4 on which rests a disk 5. This disk fits within the upstanding margin 6 of the member 1 and serves to stiffen the bore-covering portion of the cap. The margin 6 is designed to be made to conform to the downwardly and outwardly flaring inner wall of the bottle adjacent to its pouring lip 7 and extends over this lip in a series of corrugations 8 and then downwardly on the outer side thereof so as to form a housing completely enclosing the pouring lip portion of the bottle.

As shown best in Figures 1 and 18 to 21 the machine to which the mechanism of the invention is attached is provided with a platform 10 on which the bottles to be capped may be supported, this platform being a portion of the machine frame within which is housed certain operative mechanisms of the machine. Extending upwardly from this platform 10 are a pair of spaced bars 11. Adjustable vertically on these bars are a pair of sleeves 12 which may be clamped at the desired height above the platform 10 corresponding to the heights of the bottles to be capped by any suitable means such as set screws 13 having hand wheels 14 at their outer ends, these set screws being threaded through the sleeves 12 and their inner ends engaging in any of a plurality of depressions in the bars 11. These sleeves 12 have forwardly projecting portions 15 which carry at their forward ends sleeves 16 through which are vertically slidable portions 20 of the cap applying devices. The portions 20 comprise tubular elements as shown best in Figure 4, the lower ends of which are fixed as by being threaded thereinto as at 21 to capping heads 22. Each of these heads 22 has an opening or socket portion 23 which may take over the upper end of a bottle to be capped. Each of the heads 22 is fixed to a platform 24 therebeneath as by means of bolts 25 extending through lugs 26 on the heads and threaded into lugs 27 on the platforms, these platforms having tapering perforations 28 therethrough in axial alinement with the sockets 23 of the heads.

Figures 4, 5, 6, 7, 8, 9:
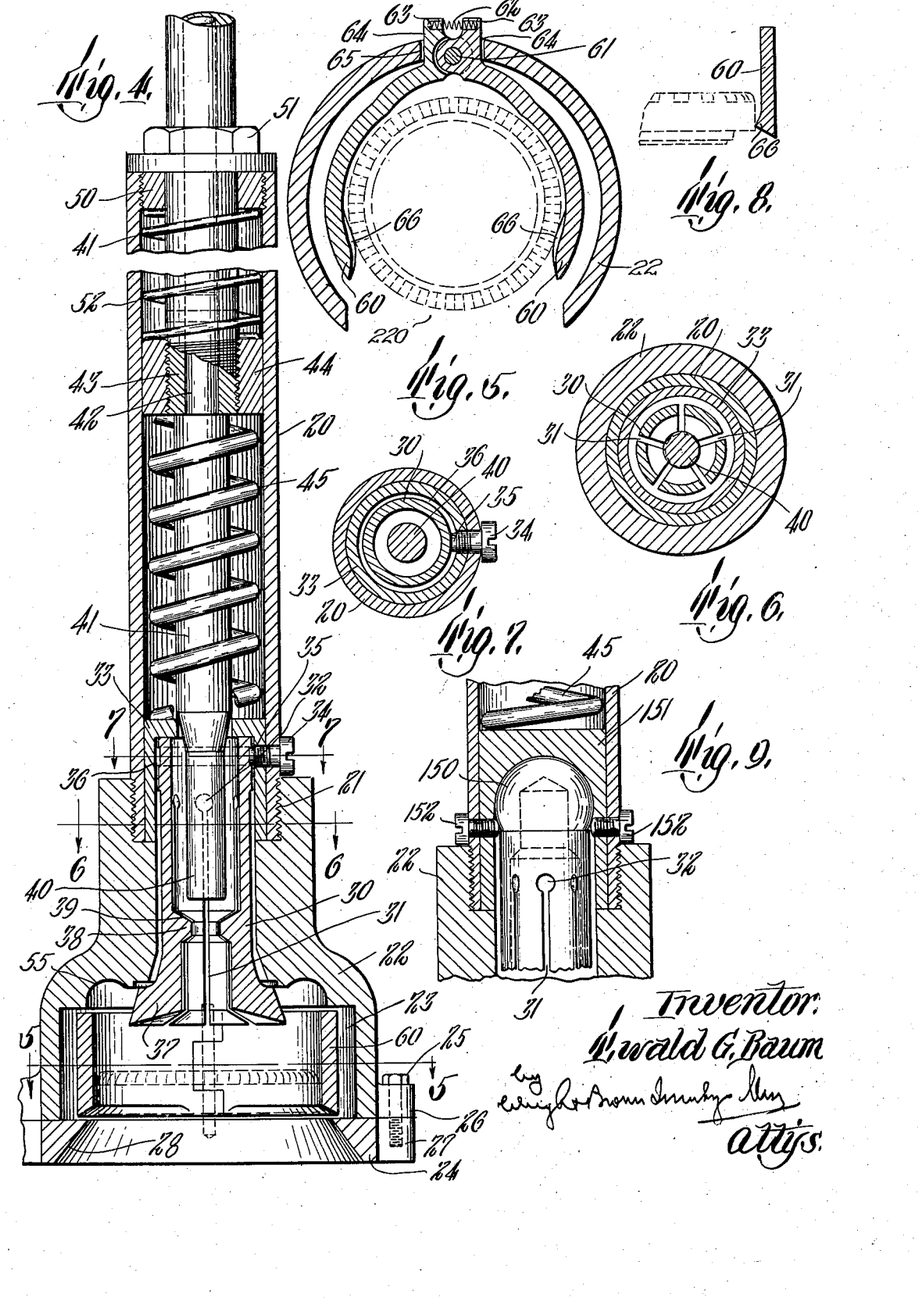
Figure 4 is a vertical section through another form of cap applying means.
Figures 5, 6 and 7 are detail sections on lines 5—5, 6—6, and 7—7, respectively, of Figure 4.
Figure 8 is a detail section of a cap-holding arm illustrating by dotted lines a cap held thereby.
Figure 9 is a detail section showing a modified plunger construction.

Within each of the heads 22 is positioned a cap applying and expanding plunger 30. As shown in Figure 4 this plunger may be formed as a sleeve split upwardly from its lower end as by means of the kerfs 31 which terminate in enlarged perforations 32 adjacent to its upper end. The plunger engages somewhat loosely at its upper end within a socket member 33 positioned within the member 20 and within which it may be retained in position by means of a set screw 34 which extends through the member 20 and the socket member 33 and has its reduced extremity 35 engaging within an annular groove 36 in the upper end of the plunger. Somewhat below this groove 36 the plunger is of reduced external diameter so that the sections 37 thereof between the kerfs may be expanded somewhat without coming into engagement with the inner wall of the head and so that due to their resiliency and the slightly loose connection of the upper end of the plunger with the sleeve 20, they may automatically center themselves with relation to the bottle so that they may conform to the contour of the mouth thereof. The lower ends of these sections taper downwardly and outwardly to form cap engaging faces.

As shown in Figure 4 the sleeve 30 is formed with a portion 38 of reduced internal diameter somewhat above its lower end, the upper wall of this reduced portion being frusto-conical as shown at 39. Upon this frusto-conical portion may impinge the lower end 40 of a rod 41 which extends upwardly through the portion 20 and has its upper reduced extremity 42 engaging within the lower end of a tube 43 which is externally threaded at its lower end for the reception of an internally threaded collar 44 which fits slidingly within the member 20. A relatively heavy coil spring 45 surrounds the rod 41 and bears at its upper end against the lower face of the collar 44 and at its lower end against the upper face of the socket member 33. By this means the rod 41 is normally held elevated relative to the shoulder 38 so that its lower end is out of contact therewith but by depression of the tube 43 the head 22 being held stationary the rod 41 may be depressed until its lower end contacts with the shoulder 38 and acts to expand the portions 37 of the cap-applying plunger. The upper end of the member 20 is closed off as by means of a threaded plug 50 which has a polygonal head 51 by which it may be readily turned. This plug 50 is perforated for the slidable reception of the tube 43 and a spring 52 of less strength than the spring 45 is positioned about the tube 43 and bears at its upper end against the lower face of the plug 50 and at its lower end against the upper face of the collar 44. By downward movement of the tube 43, therefore, it will be seen that the member 20 carrying the head 22 and the cap-applying plunger is carried downwardly therewith until the upper end of a bottle is encountered, whereupon further downward motion of the tube 43 may continue alone, the head 22 being arrested by engagement of the upper end of the bottle within an annular recess 55 at the upper portion of its socket. The plunger is extended sufficiently beneath this recess 55 so that a cap carried therebeneath has been inserted within the bottle by the time the downward motion of the head has been arrested by the bottle, whereupon the engagement of the lower end of the rod 41 with the shoulder 38 causes the members 37 to expand and press the inner wall portion 6 of the cap against the inner face of the bottle. During this time the head is held down against the bottle by the constantly increasing pressure exerted by the spring 45 as the tube 43 descends. As the tube 43 is thereafter raised the rod 41 is first withdrawn from its expanding contact with the plunger and then the sleeve 44 acting through the spring 41 causes a resilient upward pull to be exerted on the head so as to remove the head and plunger from the bottle.

Within the socket 23 of the head is positioned a device for holding a cap in position beneath the applying plunger. As shown best in Figures 4 and 5 this comprises a pair of arcuate arms 60 hinged together adjacent one end, as at 61, and normally pressed toward each other to a limited extent by means of a spring 62 engaging in opposed sockets 63 in lugs 64 extending rearwardly from the pivot 61 through a slot 65 in the head 22, the walls of this slot acting as stops to limit the extent of closing movement of these arms. Adjacent to their free extremities they are formed at their lower sides with inwardly extending portions 66 which engage the caps placed therebetween on their outer faces adjacent to the lower downturned edges thereof as shown in Figure 8. The forward portion of each of the heads 22 is provided with an opening 220 through which the caps may be passed into position between the arms 60 beneath the applying plunger.

Each of the tubes 43 by which the heads and plungers are given their vertical movement is threaded at its upper end and passes through a laterally extending portion 76 of a member 77. This member 77 is carried at the upper end of a sleeve 78 which is axially adjustable on a vertically reciprocating rod 79 which extends through the platform 10 and has pivoted at its lower end a link 80 which connects it to the outer end of a lever arm 81 fulcrumed at 82 (see Figure 19). Slidable on this arm 81 is a sleeve 83 which is pivotally connected to the outer end of a crank 84 fixed to a shaft 85. This shaft 85 is driven in time with the various other mechanisms of the filling machine and by its rotation effects a rocking movement of the arm 81 as shown in full and dotted lines in Figure 19, thus giving a vertical reciprocatory motion to the rod 79.

When the sleeves 12 are moved up or down on the bars 11 to adjust the machine to bottles of different heights, a corresponding adjustment of the member 77 and its sleeve 78 must be made on the rod 79 in order that the parts which are moved by the rod 79 and the normally fixed parts (e. g., the sleeve 16) may maintain the same relations in operation. To this end the rod 79 is provided with a series of slots 90 therein (Figure 3) corresponding to heights of standard sizes of milk bottles in any of which slots may be engaged a latch 91 horizontally slidable through an opening 92 in the member 77. The latch 91 is normally urged into the slot which may be opposite thereto by means of a spring 93 reacting between it and a plug 94 threaded into the forward end of the opening 92. A controlling rod 95 extends through a central perforation in the plug 94 and engages the latch 91 and outwardly of the plug 94 this rod is bent to form a handle 96 having an inwardly turned end 97 which may be engaged in a socket 98 in the member 77 when the latch is in engagement in any of the notches 90. By pulling outwardly on the handle 96, the latch 91 may be moved from engagement with the notches 90 and the member 77 adjusted vertically to the proper position, whereupon the latch may be permitted to enter the slot 90 then opposite thereto to lock the parts in adjusted position. By turning the handle 96 to bring the end 97 out of registry with the perforation 98 the latch may be held out of notch-engaging position as long as may be desired so that the member 77 may be freely adjusted vertically on the rod 79. It will be seen from this description that the rod 79 acts to impart the vertical reciprocations to the head 22 and the cap applying plunger in order to apply caps to the bottles and then retract therefrom to permit the removal of the bottles and the positioning of others to be capped.

Figures 1, 2, 3:
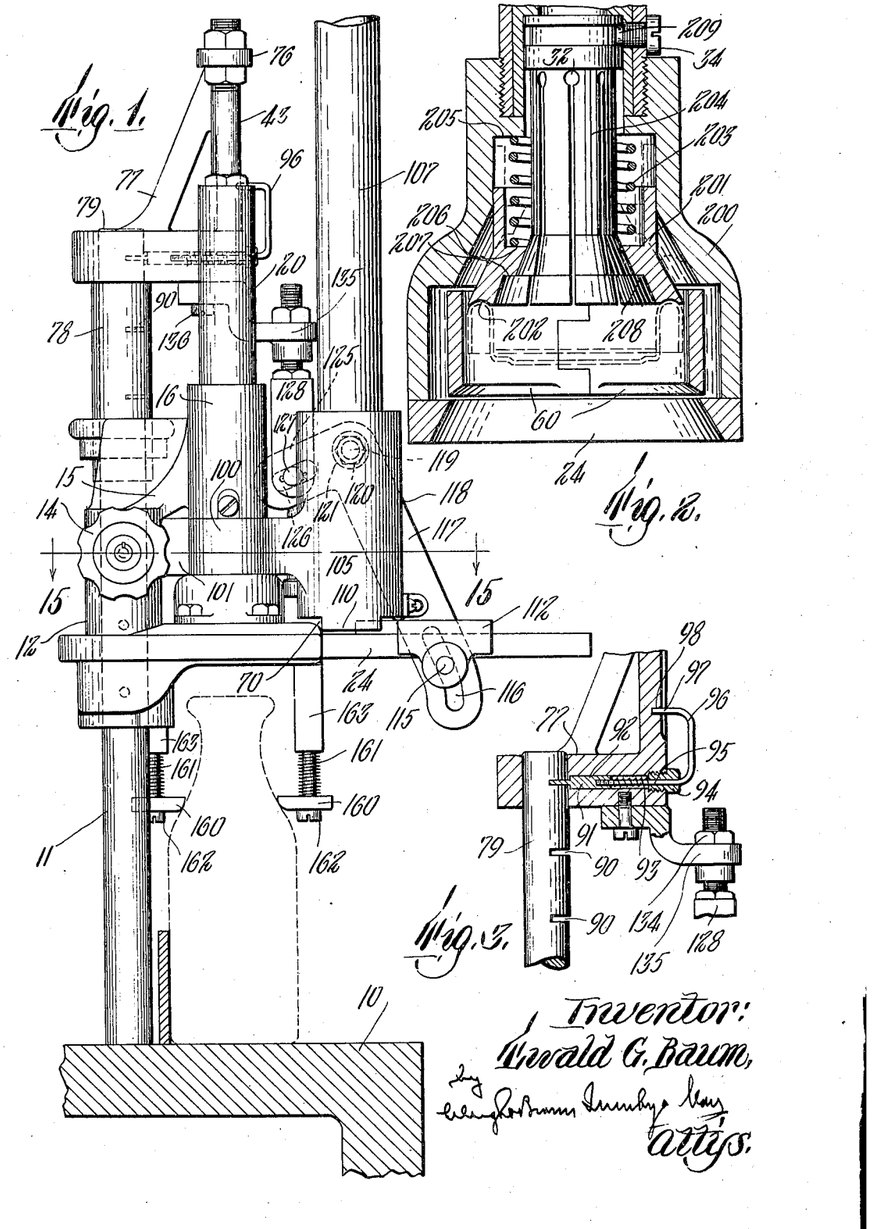
Figure 1 is a side elevation of the mechanism showing a portion of the machine frame, a bottle in position to be capped being shown in dotted lines.
Figure 2 is a detail partly in vertical section showing one form of cap applying means.
Figure 3 is a detail partly in section showing an adjustment to conform to bottles of different capacities.

Mechanism is also provided for automatically feeding caps from a magazine to each of the applying heads and plungers and this mechanism is so constructed that should a bottle not be present at the descent of the head and plunger at any time, the cap in position to be applied will not be ejected from the head and no new cap will be fed into position prior to the succeeding capping movement thereof. Surrounding the head 22 above its socket portion is a member 100 at the rear end of which is a rib 101 engaging in a vertical slot 102 in the sleeve 12. This member 100 projects forwardly of the sleeve 16 and is formed as a cap magazine 105 which is preferably slotted at its outer end as at 106 so that the positions of the caps therein may be readily ascertained. If desired the upper portion of this magazine may be formed to permit the insertion therein of a tubular container 107, as illustrated in Figure 1, in which caps may be assembled and placed in position to feed into the magazine 105, the tubular container thus serving merely as an extension to increase the capacity of the supply. The lower end of the magazine is positioned sufficiently above the upper face of the platform 24 as at 70 so that a single cap may be moved therefrom along the platform 24 through the slot 70 and into the socket 23 of the head 22. Preferably side wall portions 110 are extended downwardly somewhat to serve as guide means to insure the correct lateral positioning of the caps as they are moved from the magazine to the applying head.

Figures 14, 15, 16, 17:
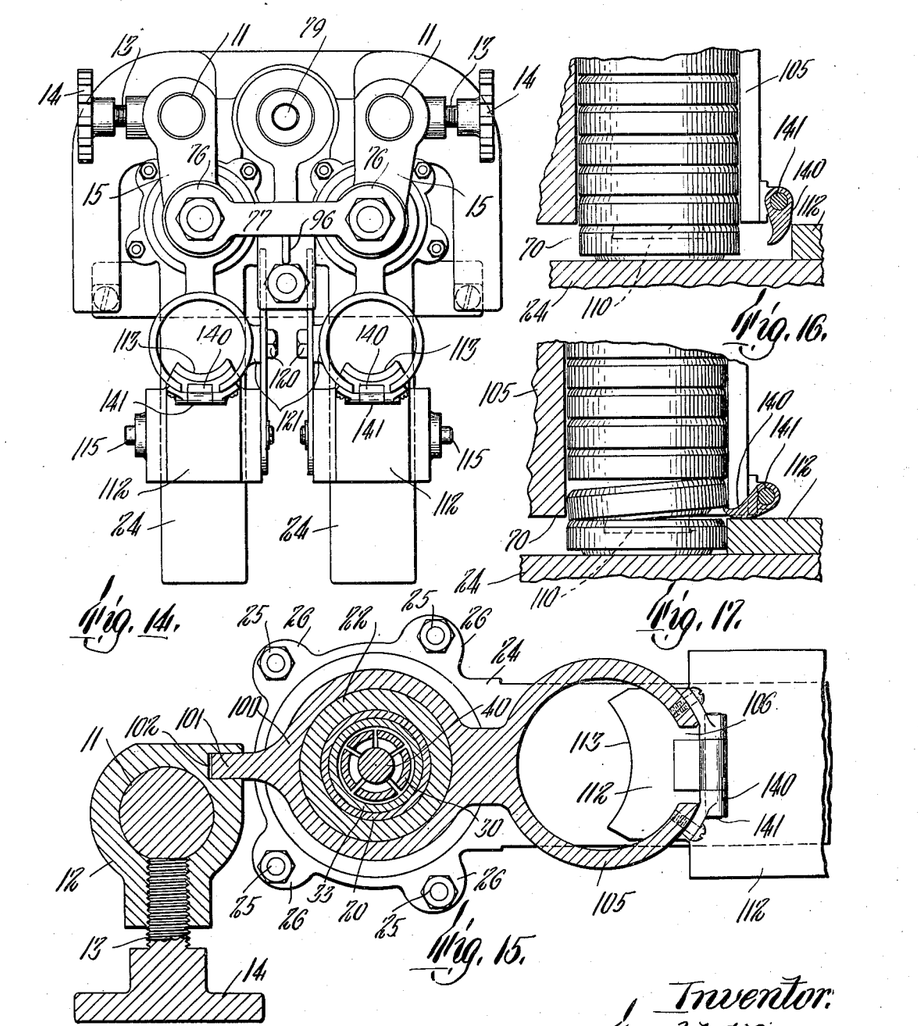
Figure 14 is a top plan of the mechanism.
Figure 15 is a horizontal section on line 15—15 of Figure 1.
Figures 16 and 17 are detail views partly in section of the cap magazine and feeding device.

Means for moving the caps from each magazine to the corresponding head comprises a feed slide 112 having, as shown best in Figure 14, a curved forward end 113 shaped for engagement with the side of the cap. This slide is movable over the face of the platform 24 and extends down on either side thereof so that it is guided for longitudinal motion. The downwardly extending side portions of each slide 112 are perforated for the reception of a pivot pin 115 which passes beneath the platform 24, and one end of this pivot pin passes through a slot 116 in the long arm 117 of a bell crank lever 118 fulcrumed at 119 on a bolt 120 threaded into a lug 121 adjacent to the upper end of the magazine. The short arm 125 of this bell crank lever is slotted as at 126 and through this slot extends a pin 127 carried at the lower end of one of the branches of a bifurcated block 128 (see Figures 10 and 11). This block is slidable on the lower portion of a rod 129 on which is adjustably fixed a collar 130 with which the block 128 is normally held in engagement by means of a spring 131 surrounding the lower reduced portion 132 of the rod 129 and bearing at its upper end against the block and at its lower end against a head 133 of the rod 129. The upper end of the rod 129 is threaded through the forward end of a bracket 135 which is fixed as by means of a bolt 136 to the member 77. The rod 129 may have a lock nut 134 applied to its upper end. By this construction as the member 77 is moved downwardly carrying therewith the head 22, the plunger, the cap magazine and the platform 24, the short arm 125 and the fulcrum of each of the bell crank levers 118 are correspondingly moved so that there is no rocking motion imparted to the bell crank levers and consequently no sliding motion to the feed slide 112.

Figures 18, 19, 20, 21:
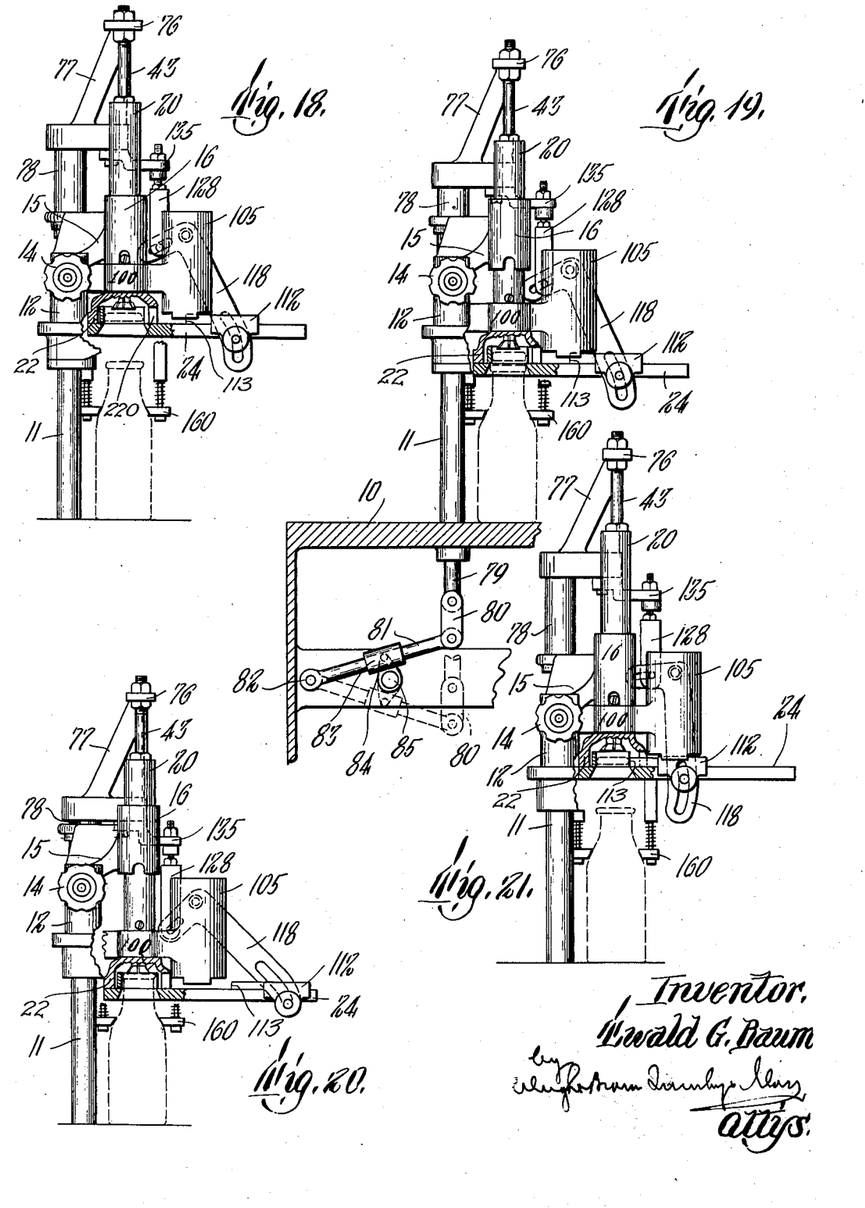
Figures 18 to 21 are views partly in section showing successive stages in the cycle of operation of the mechanism.

If now a bottle be in position beneath the head 22, downward motion of this head is after a predetermined extent of motion arrested by the bottle and at the same time downward motion of the magazine and the platform 24 is also arrested. The downward movement of the member 77 still continues, however, thus causing a positive downward motion to be imparted to the short arm of the bell crank lever 125, retracting the slide 112 into the position shown in Figure 16, whereupon the caps in the magazine are permitted to drop down so that the lowest cap therein rests on the upper face of the table 24. When the slide is in this retracted position, a cap lifting element 140 pivoted at 141 adjacent to the open side of the magazine is permitted to drop downwardly into the position shown in Figure 16. After the cap has been applied to the bottle as shown in Figure 20 and the member 77 starts to rise therefrom, the head 22, and together with it, the magazine and the table 24, are held downwardly for a time, due to the tension of the spring 45, and during this initial retracting movement of the member 77, the bell crank lever 118 is rocked resiliently in the opposite direction through its spring connection 131 with the member 77 to bring the slide 112 toward the lowest cap of the stack in the magazine. Before it reaches this, however, it impinges on the lifting member 140 which is pushed into position between the two lowest caps in the stack to engage beneath the edge of the cap above that which is next to be fed, as shown in Figure 17, thus raising the superposed caps sufficiently from the cap to be fed so that this cap is free to be slid out from beneath the stack and into the socket 23 of the head. This feeding movement of the slide 112 continues during the expansion of the spring 45 until the parts of the machine reach the positions shown in Figure 19. Further upward movement of the member 77 and tube 43 carries the platform 24 and magazine upwardly therewith to the position shown in Figure 18, at which point the member 100 brings up against the fixed sleeve 16. During this elevation of the platform 24 to clear the top of the capped bottle, there is no appreciable relative movement between fulcra 119 and the pins 127 since both are moving upwardly together. Hence during this portion of the operation, there is a dwell in the feeding movement of the slide 112, this dwell occurring when the forward end 113 of the slide is part way across the magazine as in Figure 15. When the member 100 engages the fixed sleeve 16, as in Figure 18, further upward movement of the magazine 105 and fulcra 119 is stopped. The member 77, however, continues to rise against the pressure of the spring 52 to the position shown in Figure 21, continuing the upward movement of the pins 127 and rocking the bell crank 118 to continue the feeding movement of the slide 112 sufficiently to push the next cap into place in the socket 23 between the holding arms 60. On subsequent downward motion of the member 77, the first action is to retract the slide 112 from the socket 23 of the head 22 as shown in Figure 18, so that the parts are in proper position for the head to descend upon the bottle top and apply the cap thereto, and during the last portion of the downward stroke from the position shown in Figure 19 the slide retracts completely as shown in Figure 20, preparatory to a succeeding feed motion as previously described. If a bottle is not positioned beneath either one of the heads 22, this head is not stopped in its descent with the member 77, whereupon the corresponding feed slide fails to be actuated and no cap is delivered.

It may be found desirable to avoid the positive expanding of the cap applying plunger. Where this is desirable the plunger construction illustrated in Figure 9 may be employed. In this figure the upper end of the cap applying plunger is shown as formed with a ball head 150 seated within a similar shaped socket in a block 151. This block 151 takes the place of the socket member 33 in the form shown in Figure 4. The ball head 150 may be held in position therein by means of set screws 152 passing through the member 20, and the block 151 and having their ends projecting beneath the head 150. In this form of construction the rod 41 is not employed, the spring 45 engaging the head 151 and serving to apply resilient pressure thereto in the same manner that it applies pressure to the socket member 33 on descent of the tube 43 in the form shown in Figure 4. The pressure between the lower face of the plunger and the cap is then relied upon to expand the lower end of the plunger.

It is sometimes found desirable to provide means for holding the bottle firmly on the platform 10 during the capping operation. One form of mechanism by which this may be accomplished comprises hold down bars 160 normally urged downwardly by springs 161 surrounding screws 162 threaded into posts 163 projecting downwardly from the platform 24.

Another construction of bottle-holding mechanism is shown in Figure 2 in which the head 200 is recessed to receive a sleeve 201 having its lower end 202 shaped to engage over the pouring lip housing portion of the bottle cap which is shown in position in dotted lines therebeneath, this sleeve being guided for vertical reciprocation within the head 200 and being normally pressed downwardly by means of a spring 203 surrounding the cap-applying plunger 204 (shown in full) and reacting between an annular shoulder 205 within the head 200 and a shoulder 206 on the sleeve 201 (shown in section). After the sleeve 201 has engaged the top of a bottle, further descent of the head 200 against the reaction of the bottle compresses the spring 203 and causes the sleeve 201 to take the position relative to the head indicated by dotted lines. The downward limit of motion of this sleeve relative to the head 200 is determined by the engagment of an annular shoulder 207 thereon against a mating annular shoulder 208 adjacent to the lower portion of the plunger 204. As shown the upper end of this plunger is provided with an annular groove 209 for the reception of the screw 34 in a similar manner to that shown in Figure 4, but of course if desired, it might be constructed with a ball head and be mounted similarly to the construction shown in Figure 9. In this construction it will be seen that the sleeve 201 presses against the pouring lip housing of the cap and thus against the top of the bottle, this pressure continuing until the head and the plunger have retracted sufficiently to bring the shoulder 208 of the plunger into contact with the shoulder 207, whereupon the sleeve is positively retracted from contact with the bottle cap.

Having thus described certain embodiments of this invention, it should be evident to those skilled in the art that various changes and modifications might be made therein without departing from its spirit or scope as defined by the appended claims.

I claim:

1. In a capping mechanism, a head having an opening engaging over and around the neck of a bottle to be capped, a plunger comprising a sleeve slotted inwardly from one end, said end being formed with cap-engaging faces, said plunger being fixed against vertical movement relative to the neck-engaging portion of said head, and means for bringing said head over the top of a bottle to set a cap therein beneath said plunger into the neck of said bottle and to expand an upstanding portion of said cap against the internal wall thereof.

2. In a capping mechanism, a head having an opening engaging over and around the neck of a bottle to be capped, a plunger comprising a sleeve slotted inwardly from one end, said end being formed with cap-engaging faces with capability of limited universally pivoted movement relative thereto, said plunger being fixed against vertical movement relative to the neck-engaging portion of said head, and means for bringing said head over the top of a bottle to set a cap therein beneath said plunger into the neck of said bottle and to expand an upstanding portion of said cap against the internal wall thereof.

3. In a capping mechanism, a head having an opening engaging over and around the neck of a bottle to be capped, a plunger comprising a sleeve slotted inwardly from one end, said end being formed with cap-engaging faces, said plunger being fixed against vertical movement relative to the neck-engaging portion of said head, means for inserting a cap in said head beneath said plunger, and means for bringing said head over the top of a bottle to set a cap therein beneath said plunger into the neck of said bottle and to expand an upstanding portion of said cap against the internal wall thereof.

4. In a capping mechanism, a head having an opening engaging over and around the neck of a bottle to be capped, a plunger comprising a sleeve slotted inwardly from one end, said end being formed with cap-engaging faces, said plunger being fixed against vertical movement relative to the neck-engaging portion of said head, means for inserting a cap in said head beneath said plunger, means for bringing said head over the top of a bottle to set a cap therein beneath said plunger into the neck of said bottle and to expand an upstanding portion of said cap against the internal wall thereof, and means for retaining the cap in said head.

5. A bottle capping mechanism comprising in combination, a support for a bottle to be capped, a vertically movable head having an opening engaging over and around the neck of a bottle to be capped, a bottle cap holder carried by said head and movable therewith to present a cap to a bottle on said support, a cap applying plunger connected to said head and fixed against vertical movement relative to the neck-engaging portion of said head, and means for moving said plunger vertically carrying said head therewith until arrested by contact with a bottle on said support to apply a cap on said bottle, said plunger being expansible to press an upstanding portion of said cap into engagement with the inner wall of the bottle.

6. A bottle capping mechanism comprising in combination, a support for a bottle to be capped, a vertically movable head having an opening engaging over and around the neck of a bottle to be capped, a bottle cap holder carried by said head and movable therewith to present a cap to a bottle on said support and within which the bottle neck may extend, a cap-applying plunger connected to said head and fixed against vertical movement relative to the neck-engaging portion of said head, and means for moving said plunger vertically carrying said head therewith until arrested by contact with a bottle on said support to apply a cap on said bottle, said plunger being expansible to press an upstanding portion of said cap into engagement with the inner wall of the bottle.

7. In a capping mechanism, a vertically movable head, a cap applying plunger within said head, a pair of jaws hinged together within said head and spaced to receive a cap therebetween and resiliently urged into gripping relation thereto to yieldingly hold a cap against downward movement and in position to be applied on the subsequent cap applying movement of said head and plunger, and means acting in timed relation to said movement for presenting caps to said device.

In testimony whereof I have affixed my signature.

EWALD GEORGE BAUM.